Feb. 8, 1938.  B. F. FITCH  2,107,292
FREIGHT HANDLING APPARATUS
Filed Jan. 22, 1934  2 Sheets-Sheet 1
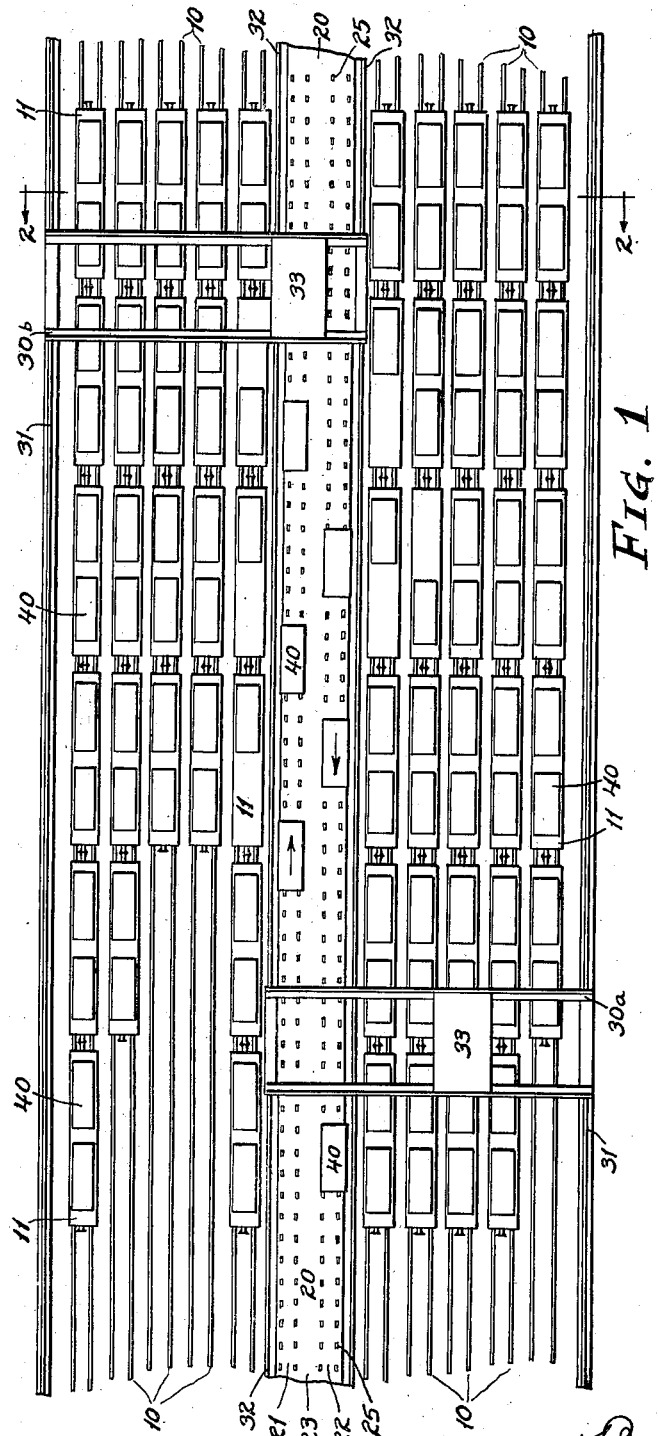
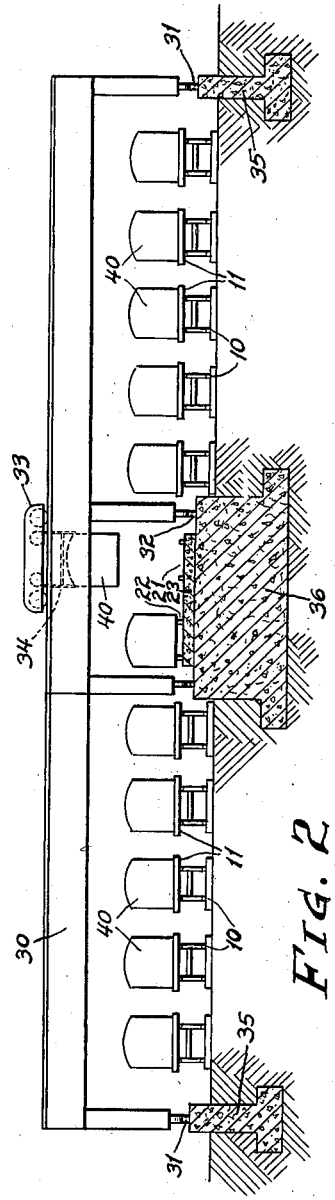
Inventor
Benjamin F. Fitch,
By Bates, Goldick & Fear,
Attorneys.

Feb. 8, 1938. B. F. FITCH 2,107,292
FREIGHT HANDLING APPARATUS
Filed Jan. 22, 1934   2 Sheets-Sheet 2
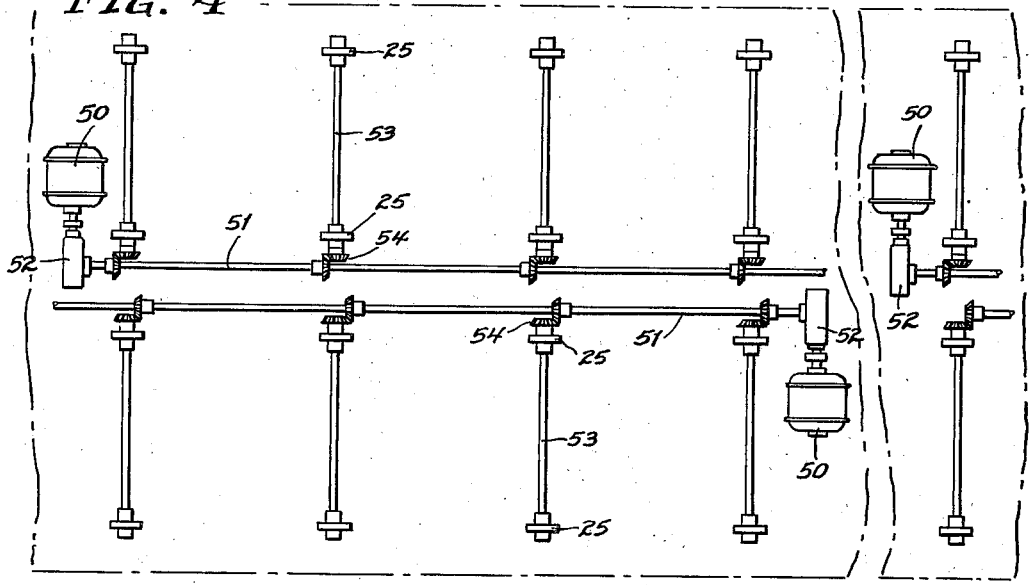
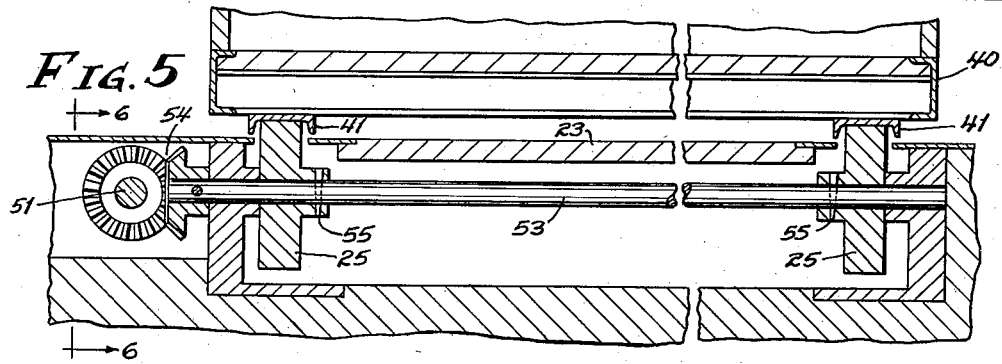
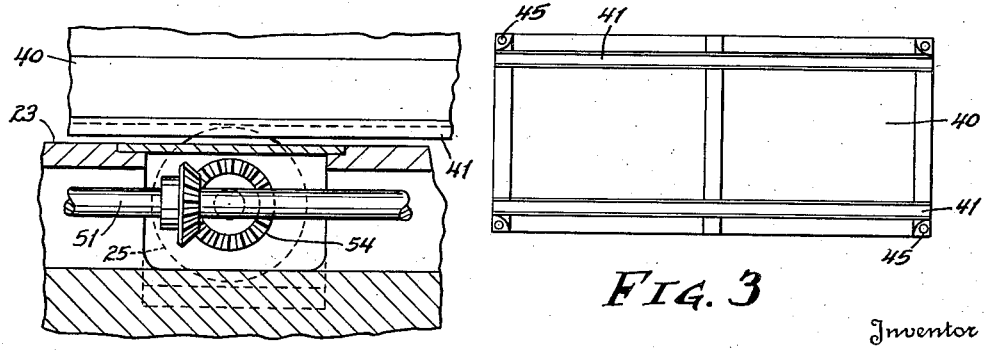
Inventor
Benjamin F. Fitch
By Bates, Goldrick & Teare
Attorneys Patented Feb. 8, 1938

2,107,292

UNITED STATES PATENT OFFICE 2,107,292

FREIGHT HANDLING APPARATUS

Benjamin F. Fitch, Greenwich, Conn., assignor to Motor Terminals Company, New York, N. Y., a corporation of Delaware Application January 22, 1934, Serial No. 707,707

15 Claims. (Cl. 214—38)

This invention relates to a system for rapidly transferring freight containers from flat cars of incoming trains to outgoing trains. For instance, trains may arrive at a transfer station or classification yard of a railroad with freight destined for various points. Instead of hand-trucking the freight from the different arriving cars to other cars for each destination, or breaking up the train and switching the cars to make up new trains for different points, I propose to remove bodily from the incoming cars individual containers carrying freight each for specified points or routes and reallocate such containers on cars of an outgoing train destined for the appropriate route or region.

To accomplish this result efficiently and rapidly, I use several parallel railroad tracks having adjacent to them and also parallel with them a conveyor system adapted to move in opposite directions parallel to the tracks. Surmounting the tracks and the conveyor are a plurality of cranes, each of which surmount certain of the tracks and both of the conveyors.

In my preferred form, the conveyor system is placed between two groups of tracks, and each crane bridges one of the groups of tracks and also the two conveyors. These cranes are so mounted that while each spans the conveyors, every alternate one spans the same group of tracks, while the cranes between these alternate ones span the other group of tracks.

The conveyor system comprises two runways, each with means for moving a conveyor in one of two opposite directions, parallel with the tracks. Each runway comprises a flat surface with upwardly extending power-driven rollers protruding therefrom, which are adapted to carry a freight container and propel it along the conveyor system. Suitable guide rails on the underside of the freight containers retain them on the conveyor.

Flat cars, having freight containers thereon, are drawn in on the track as a connected part of an incoming train. Several of these incoming trains may be placed side by side. Outgoing trains are also located within the confines of the system, having empty flat cars adapted to receive freight containers. By means of the cranes and conveyor system, it is possible to transfer rapidly a demountable freight container from an incoming flat car to an outgoing flat car, and thus avoid the constant switching of cars which normally occurs when one train is broken up to supply cars for another train.

The objects of the invention above indicated and other objects will become more apparent from the specification following and the accompanying drawings. The novel features of my invention will be set forth in the claims.

Referring now to the drawings, Fig. 1 is a plan of my improved freight-handling system; Fig. 2 is a section through this system as indicated by 2—2 in Fig. 1; Fig. 3 is a bottom view of one of my demountable truck bodies constituting a freight container, showing the runways adapted to ride on the rollers of the conveyor system; Fig. 4 is a view of my conveyor rollers and the driving means therefor; Fig. 5 is a longitudinal section through one pair of rollers, showing a container mounted thereon; Fig. 6 is a section through one of the roller units, as indicated by 6—6 on Fig. 5.

The system, in general, comprises a plurality of parallel railroad tracks 10 in conjunction with a conveyor system 20 and cranes 30. A train, containing flat cars 11, ready to have containers removed or placed thereon, is drawn within the confines of my system, along one of the several parallel tracks. These cars 11 are suitably coupled together to form a train and each has room for receiving two or more demountable truck bodies 40 serving as containers.

The conveyor system is so located that an equal number of tracks lie on each side thereof. This system comprises two runways or conveyors proper 21 and 22, mounted on a platform 23. The two conveyors are adapted to move in opposite directions and are power-driven by means such as will hereinafter be described. The conveyors comprise a series of rollers projecting above the surface 23 and so spaced as to carry demountable containers 40 by occupying channels 41 on the bottom thereof.

Surmounting the tracks and conveyor system are a plurality of cranes, as 30a and 30b, each crane bridging one group of tracks and the conveyor system. Each crane is carried on a pair of tracks. One of these tracks 31 is adjacent and parallel to the outer edges of the railroad track system and the tracks 32 are adjacent the sides of the conveyor system. Each crane is mounted on tracks 31 and 32, that the conveyor system lies between the occupied crane tracks, thus allowing each crane to surmount its group of railroad tracks and conveyor, successive cranes bridging the railroad tracks on different sides of the conveyors. Each crane has a suitable traveling frame 33 mounted thereon and adapted to move at right angles to the main crane-supporting track. This frame carries raising mechanism supporting a cradle 34 beneath and adapted to engage hooks on a body 40 to raise it from its support, in a manner well known in this art.

It is desirable that the crane trackways be firmly supported on suitable bases. For this reason, concrete pillars 35 and a concrete conveyor base 36 are used on which to mount the track rails. Also mounted on the conveyor base 36 is a raised platform 23, which in turn carries component parts for the conveyor system, such as the driving rolls and the motors to cause their rotation.

Suppose then that several trains arriving from different regions are located within the confines of the system, each of them carrying demountable truck body containers 40, which it is desired to ship to a specific location. One of the cranes may engage a container which is to be so moved and lift it from the flat car on which it has arrived, and may then carry this container to the conveyor system and place it on the particular conveyor moving in the direction toward the car on the outgoing train on which it is to be placed. This demountable container is then conveyed along until it enters the confines of the area covered by the crane nearest the car on which it is to be loaded. It is then lifted from the conveyor by the second crane and deposited on the car, which completes its transfer and renders the body ready for outgoing movement.

Suitable driving means are required for the rolls 25 comprising the conveyor. An electric motor 50 or other suitable source of power drives a shaft 51, which in turn drives a plurality of rollers. This shaft is driven by the motor through a suitable reduction gear, preferably comprising a worm and a pinion 52. Spaced at right angles to this driven shaft are shorter shafts 53, supporting the rollers 25 thereon. To drivingly engage the shaft 53 and the shaft 51, a pair of bevel gears 54 is employed. These gears may embody a speed reduction, or not, as desired. Although one motor may be used to drive a considerable number of rollers, it is often preferable to use several individual motors. Then, if for any reason, part of the conveyor system is to be stopped, this may be done without affecting any of the rest.

Suitable controls are desirable to operate the roller mechanisms. Such a control system may be operable from a single control station, and if desired, these stations may be duplicated in various parts of the system. It may be desirable that each crane have a complete operating system for the conveyor, in order that the operator may be able to control either the entire conveyor system or that portion adjacent the operating region of his crane. Partial operation of the conveyor system is possible, because of the plurality of motors used to drive the roller system, one motor driving a different group of rollers, and each motor being individually controlled or linked with the others as desired.

Each pair of rollers mounted on a single shaft 53 comprise a separate unit. Rotative power is taken from the drive shaft 51, as in Fig. 5, and transferred by means of a bevel gear to the auxiliary shaft 53, which carries the rollers 25 retained by pins 55. These rollers project upwardly beyond the surface of the floor 23, as indicated.

Each demountable container should embody means for handling it on each of the transporting means, which may carry it. Each container has corner sockets 45 at the bottom thereof, adapted to nest on projections which mate therewith on the cars 11 and retain the container thereon. Adjacent these sockets are the channels 41 extending longitudinally along the bottom of the container. These channels 41 ride on the rollers 25, and guide the demountable container along the conveyor system. Near the top of the container on each side are a plurality of lifting hooks, adapted to be engaged by mating shackles on the cradle 34 of the cranes 30a or 30b, to lift the container either from the car on which it has been deposited, or from the conveyor on which it has been carried.

From the above description, it will be apparent that I have devised a system for transferring freight from one train to another, without the customary switching of cars. This is accomplished by packing the freight destined for one location into a demountable container and placing this container on a flat car. Whenever desired, the container may be removed by the first-acting crane from the car on which it was first deposited, and, by means of the second crane, with or without movement by the conveyor, placed on a car of an outgoing train, and thus be rerouted with respect to the train on which it formerly reposed.

Further, I have provided a freight transfer system comprising several portions which may be operated as a unit, or independently, as desired. Thus, one crane and its adjacent conveyor system may be operated, while the rest of the apparatus is allowed to remain idle. Again, I may operate one or more of the cranes and allow the conveyor system to remain immovable, acting merely as a platform. By rendering it possible to use a portion of the system to the exclusion of the rest, a substantial saving in power supply cost may often be effected, and further, if a traffic tie-up occurs in one portion of the system, the rest may continue to operate.

I claim:

1. The combination of two vehicle areas spaced apart with an intervening longitudinal space, a traveling crane extending over said intervening longitudinal space and only one of the vehicle areas, and another traveling crane extending over said intervening space and only the other vehicle area, and means to support each crane at its ends whereby the intervening longitudinal space lies between the supports for each crane.

2. The combination of two parallel groups of railroad tracks with a space between the groups and two traveling cranes, one of which extends permanently over one group of railroad tracks and the said intervening space, and the other of which extends permanently over the other group of railroad tracks and said intervening space, each crane terminating at the relatively distant side of said intervening space.

3. The combination of two vehicle areas extending for considerable length parallel with each other and spaced apart, a longitudinal conveyor in the space between the areas, a traveling crane extending continually over both the longitudinal conveyor and only one of the areas, and another traveling crane extending over the longitudinal conveyor and only the other area.

4. The combination of two groups of railroad tracks, said groups being parallel with each other and spaced apart, a longitudinal conveyor in the space between the groups adapted to engage the lower portion of demountable bodies, two parallel traveling cranes, one of which extends over the conveyor and one group of railroad tracks and the other of which extends over the conveyor and the other group of railroad tracks, each traveling crane being supported at one end on the outer side of the corresponding group of tracks and at the other end on the relatively far side of the conveyor, each crane being adapted to coact with a demountable automobile body on a railroad car on one of said tracks, transport it laterally, and deposit it on the conveyor.

5. In a freight handling apparatus, the combination of two vehicle supports spaced apart, a conveyor system mounted between said vehicle supports extending parallel therewith and comprising a plurality of aligned power-driven floor rollers, crane supporting tracks on the outer sides of the vehicle supports respectively, the crane supporting tracks extending along the conveyor area, all of said tracks being parallel with each other, one traveling crane supported at its ends on the one of the distant crane tracks and one of the tracks adjacent the conveyor, and another traveling crane supported at its ends on the other distant crane track and the other track along the conveyor, whereby one crane may transfer demountable bodies from vehicles on one support to the conveyor and the other crane may transfer demountable bodies from the conveyor to vehicles on the other support.

6. In a freight handling apparatus, the combination of two spaced apart vehicle areas, a pair of conveyors permanently mounted between the areas and comprising devices adapted to operate to move demountable bodies in respectively opposite directions, a plurality of traveling cranes movable along tracks parallel with the conveyors, each crane bridging both of the conveyors and a vehicle area at one side thereof, each crane having a traveling hoist moving transversely of the conveyors, one crane serving the area on the right side and the next on the left side, whereby each conveyor may carry a demountable body, transferred to it by a crane, into the region served by another crane.

7. In a freight handling system, the combination of two groups of parallel railroad tracks, a pair of conveyors permanently located therebetween, and each adapted to support a demountable body deposited on the conveyor, said conveyors operating in opposite directions parallel to said railroad tracks, and a plurality of traveling cranes, each alternate crane being adapted to bridge one group of tracks and the conveyors, and the intermediate crane adapted to bridge the other group of tracks and conveyors, whereby each crane may be moved to overlie any portion of the conveyors, together with means on said crane to transfer a demountable body from the tracks to the conveyor.

8. In a freight handling apparatus comprising two groups of railroad tracks, adapted to support flat cars having demountable truck bodies thereon, the combination of a pair of conveyors between said groups, respectively arranged to move such demountable bodies in opposite directions, and a plurality of traveling cranes, each operatively bridging a group of tracks and the two conveyors, whereby each conveyor may carry a demountable truck body transferred thereto by one crane in respective directions into a region served by another crane.

9. In a freight handling system, including tracks for vehicles adapted to support demountable containers, the combination of successively acting conveyors parallel therewith and in alignment with each other, and adapted to move such bodies when resting thereon, power means for independently driving such successive conveyors, and mechanism for elevating demountable containers from various vehicles on the tracks and depositing such containers on one of the conveyors, and for lifting containers from one of the succeeding conveyors and depositing them on various vehicles.

10. The combination of a railroad track, a longitudinal permanent conveyor substantially parallel therewith and made up of propelling units arranged in successive groups, and a plurality of transfer mechanisms movable in the direction of the conveyor grouping and adapted to take demountable containers from cars and place them on the conveyors, said conveyors operating to move containers from the region of one transfer mechanism to the region of another transfer mechanism.

11. In a freight handling system, including separate vehicles with demountable bodies adapted to be transferred from one vehicle to another, and wherein such vehicles occupy respective elongated load-transfer areas, the combination of a conveyor mechanism between said areas, operable to move such bodies in a predetermined direction substantially parallel to said areas, and a plurality of traveling cranes, each operatively arranged to serve respective areas and adjacent portions of the conveyor mechanism, whereby bodies may be lifted by one crane from a vehicle in one of said areas, deposited on the conveyor adjacent said area, carried by the conveyor to a position opposite a vehicle to be loaded and disposed in the other area, and then carried by another crane from the conveyor to such latter vehicle.

12. In a freight handling system, including separate vehicles and demountable bodies adapted to be transferred from one vehicle to another, and wherein the vehicles to be loaded and unloaded respectively occupy separate elongated load-transfer areas, the combination of a conveyor means between said areas including separate conveyor mechanisms operating respectively to move said bodies in opposite directions substantially parallel to said areas, and a plurality of traveling cranes each operatively arranged to serve respective areas and both mechanisms of the conveyor means, whereby bodies may be lifted by either crane from a vehicle in one area and deposited on one conveyor mechanism, carried thereby in the necessary direction to a position adjacent the other area and opposite a vehicle to be loaded disposed in such other area, and then carried by another crane from the conveyor mechanism to such latter vehicle.

13. In a freight-handling system, the combination of a railroad track adapted to support cars with demountable freight-container bodies thereon, two conveyor systems side by side adjacent the track and adapted to move the demountable bodies when deposited thereon lengthwise of the track in respective opposite directions, and a plurality of hoisting mechanisms movable crosswise of the track and the conveyor systems, each mechanism having means operable to transfer said bodies from cars on the track to either conveyor system, and vice versa.

14. In a freight-handling apparatus, including two groups of vehicle supporting tracks, the combination of a pair of conveyors mounted between said groups, means respectively driving the same in a manner to move demountable bodies thereby in opposite directions parallel with tracks, and a traveling crane adapted to transfer a demountable body from a vehicle on one of the tracks onto either conveyor.

15. In a freight-handling system, including separate vehicles with demountable bodies adapted to be transferred from one vehicle to another, and wherein said vehicles occupy an elongated load-transfer area, the combination of conveyor mechanism mounted at one side of said area, means to drive said mechanism in a manner to move demounted bodies in one line in one direction substantially parallel to said area, and bodies in another line in the opposite direction, a plurality of hoist mechanisms each operatively arranged to serve respective longitudinally spaced portions of said area and laterally adjacent portions of the conveyor mechanism, whereby bodies may be lifted by either of two of said hoist mechanisms from a vehicle in respective area portions served thereby, selectively deposited on the conveyor mechanism in accordance with the desired direction of travel, carried by the conveyor mechanism to a position adjacent a portion of said area occupied by a vehicle to be loaded and then carried by the other of such two hoist mechanisms from the conveyor mechanism to the vehicle to be loaded.

BENJAMIN F. FITCH.